(12) United States Patent
Meinhart

(10) Patent No.: US 10,059,445 B2
(45) Date of Patent: Aug. 28, 2018

(54) REMOTELY OPERATED VEHICLE (ROV) AND DATA COLLECTION PROTECTION SYSTEM (DCPS)

(71) Applicant: The United States of America as represented by the Secretary of the Navy, Washington, DC (US)

(72) Inventor: Michael Meinhart, Washington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/154,920

(22) Filed: May 13, 2016

(65) Prior Publication Data

US 2017/0183096 A1    Jun. 29, 2017

Related U.S. Application Data

(60) Provisional application No. 62/160,662, filed on May 13, 2015.

(51) Int. Cl.
*B64C 39/02* (2006.01)
*G05D 1/00* (2006.01)
(Continued)

(52) U.S. Cl.
CPC ............ *B64C 39/024* (2013.01); *F41H 11/02* (2013.01); *F41H 13/00* (2013.01); *G05D 1/0022* (2013.01);
(Continued)

(58) Field of Classification Search
CPC ............ B64C 39/024; B64C 2201/027; B64C 2201/12
(Continued)

(56) References Cited

U.S. PATENT DOCUMENTS 6,006,158 A * 12/1999 Pilley ...................... G01C 23/00
340/953
6,842,674 B2 * 1/2005 Solomon ............... B64C 39/024
342/350
(Continued)

FOREIGN PATENT DOCUMENTS

AU    2003272193 A8 *  1/2004  ........... B64C 39/024
EP       1534591 A2 *  6/2005  ........... B64C 39/024
(Continued)

OTHER PUBLICATIONS

Wavelet difference reduction with region-of-interest priority in multispectral video—small target detection; Y. L. Law; F. Crosby; Quyen Huynh; Truong Nguyen; Image Processing, 2004. ICIP '04. 2004 International Conference on; Year: 2004, vol. 3 pp. 1903-1906 vol. 3, DOI: 10.1109/ICIP.2004.1421450.*
(Continued)

*Primary Examiner* — Cuong H Nguyen
(74) *Attorney, Agent, or Firm* — Christopher A. Monsey

(57) ABSTRACT

Apparatus and methods are provided including a protection system against undesired interference, presence, or data collection by remotely operated vehicle (ROV) including unmanned aerial vehicles, etc. In particular, various embodiments of the invention include a system operable to protect entities from harm or risks associated with ROVs as well as sensors carried by ROVs.

4 Claims, 10 Drawing Sheets

ANOTHER EXEMPLARY COMPONENT VIEW OF SELECTED ROV DCPS ON BOARD SYSTEMS ARCHITECTURE ELEMENTS

(51) Int. Cl.
*F41H 11/02* (2006.01)
*F41H 13/00* (2006.01)
*G08C 17/00* (2006.01)
*G08C 17/02* (2006.01)

(52) U.S. Cl.
CPC ........ *G08C 17/00* (2013.01); *B64C 2201/146* (2013.01); *G08C 17/02* (2013.01)

(58) Field of Classification Search
USPC ...................................... 701/120, 2; 340/953
See application file for complete search history.

(56) References Cited

U.S. PATENT DOCUMENTS

| 2004/0030448 | A1* | 2/2004 | Solomon | F41H 13/00 700/245 |
| 2004/0030450 | A1* | 2/2004 | Solomon | B64C 39/024 700/245 |
| 2004/0030451 | A1* | 2/2004 | Solomon | B64C 39/024 700/245 |
| 2004/0030570 | A1* | 2/2004 | Solomon | F41G 3/04 700/248 |
| 2004/0030571 | A1* | 2/2004 | Solomon | F41H 13/00 700/248 |
| 2004/0068351 | A1* | 4/2004 | Solomon | F41H 13/00 701/24 |
| 2004/0068415 | A1* | 4/2004 | Solomon | F41H 13/00 89/1.11 |
| 2004/0068416 | A1* | 4/2004 | Solomon | F41H 13/00 446/454 |
| 2004/0134336 | A1* | 7/2004 | Solomon | B64C 39/024 89/1.11 |
| 2004/0134337 | A1* | 7/2004 | Solomon | B64C 39/024 89/1.11 |
| 2015/0067746 | A1* | 3/2015 | Willis | H04N 21/2353 725/109 |
| 2016/0266579 | A1* | 9/2016 | Chen | G05D 1/0038 |

FOREIGN PATENT DOCUMENTS

| JP | 2005523415 W * | 8/2005 | ........... B64C 39/024 |
| WO | WO-2004003680 A2 * | 1/2004 | ........... B64C 39/024 |
| WO | WO-2004003680 A3 * | 2/2005 | ........... B64C 39/024 |

OTHER PUBLICATIONS

Protected system of radio control of unmanned aerial vehicle; D. Bakhtiiarov; G. Konakhovych; O. Lavrynenko; 2016 4th International Conference on Methods and Systems of Navigation and Motion Control (MSNMC); Year: 2016 pp. 196-199, DOI: 10.1109/MSNMC.2016.7783141.*

Visual-based navigation system for unmanned aerial vehicles; Piotr Kaniewski; Wojciech Grzywacz; 2017 Signal Processing Symposium (SPSympo); Year: 2017; pp. 1-6; IEEE Conferences.*

Multi-UAV UWA video surveillance system; Chen Yu et al.; 2016 14th International Conference on Control, Automation, Robotics and Vision (ICARCV); Year: 2016; pp. 1-6.*

Multi-target detection and tracking from a single camera in Unmanned Aerial Vehicles (UAVs); Jing Li et al.; 2016 IEEE/RSJ International Conference on Intelligent Robots and Systems (IROS); Year: 2016; pp. 4992-4997.*

An improved PCA-SIFT algorithm application in light small UAV image registration; Xin Yan et al.; 2017 Progress in Electromagnetics Research Symposium—Spring (PIERS); Year: 2017; pp. 2554-2558.*

* cited by examiner

SIMPLIFIED SYSTEM ARCHITECTURE OF ROV DCPS ON-BOARD COMPUTER SYSTEM
(SEE ALSO FIG. 4 FOR MORE DETAILED EMBODIMENT)

EXEMPLARY COMPONENT VIEW OF SELECTED ROV DCPS ON BOARD SYSTEMS ARCHITECTURE ELEMENTS

ANOTHER EXEMPLARY COMPONENT VIEW OF SELECTED ROV DCPS ON BOARD SYSTEMS ARCHITECTURE ELEMENTS

121

OPENCV MASTER - OPERATES CAMERA 97, EXECUTES PATTERN RECOGNITION OF POTENTIALLY UNAUTHORIZED DRONE, MATCHES IMAGES FROM CAMERA 97 OF IMAGE CAPTURES OF AN INTERCEPTED DRONE AGAINST A DATABASE OF UNAUTHORIZED DRONE DIGITAL IMAGES OR VERIFIES AUTHORIZED DRONE BASED ON AUTHORIZED DRONE IMAGES WHEN IT COMES INTO A PREDETERMINED RANGE BASED ON SIGNAL STRENGTH OF THE USF, AND OPERATES AND GENERATES A VIDEO BACK TO THE GROUND STATION 3 FOR A "GO", OR "NO GO" INTERACTION WITH THE INTERCEPTED DRONE (E.G., EXECUTION OF ATTACK SCRIPTS 125)

123

ARDUPILOT ROGUE MASTER - ONCE A GROUND STATION SENDS A "GO" SIGNAL TO ROV DCSP 1, THIS PROGRAM OVERRIDES THE FOLLOW SCRIPT 117 AND DEFAULTS IN MISSION PLANNER 111 AND USES OPENCV MASTER 121 TO VISUALLY LOCK ONTO ROGUE DRONE, THEN GENERATE FLIGHT CONTROL INPUTS FOR ACGS 79 TO ENABLE A FOLLOWING ROUTINE OF THE INTERCEPTED DRONE DESIGNATED AS AN UNAUTHORIZED DRONE BY THE GROUND STATION 3, AND INITIATES ATTACK SCRIPTS 125 WHICH SUBSTITUTES CONTROL INPUTS FROM MISSION PLANNER 111.

ATTACK SCRIPT - CONTINUES OR INITIATES EXECUTION OF THE ARDUPILOT ROGUE MASTER 123 TO ENSURES ACGS 79 MAINTAINS A PREDETERMINED SPATIAL RELATIONSHIP WITH THE INTERCEPTED/ UNAUTHORIZED DRONE, COMPARES USF SIGNALS AND VISUALS CAPTURES BY THE OPENCV MASTER 121 TO DATABASE OF IMAGES AND SIGNALS, SELECTS ONE OF A PLURALITY OF ELECTRONIC WARFARE OR ATTACK EW/A ATTACK PROGRAMS BASED ON THE IMAGES AND SIGNALS (E.G., INITIATING A WPA/WEP HACKING OF THE INTERCEPTED OR UNAUTHORIZED DRONE THEN FEEDING REPLACEMENT OR SUBSTITUTE CONTROL INPUTS INTO THE INTERCEPTED/UNAUTHORIZED DRONE FROM A LIBRARY OF INTERCEPTED/UNAUTHORIZED DRONE CONTROL INPUTS (E.G., LAND IMMEDIATELY, TURN ON A PREDETERMINED OR GROUND STATION INPUT HEADING AND LAND AT DESIGNATED LOCATION, ETC.), INITIATES SELECTED EW/A ATTACK PROGRAM, DETERMINES SUCCESS OR FAILURE OF SELECTED EW/A ATTACK PROGRAM, IF FAILURE THEN SELECTS ANOTHER EW/A ATTACK PROGRAM (E.G., JAMMING INTERCEPTED OR UNAUTHORIZED DRONE'S USF SIGNAL), DETERMINES SUCCESS OR FAILURE, IF FAILURE THEN SELECT ANOTHER EW/A ATTACK PROGRAM TO OPERATE THE ACGS 79 (E.G., CRASH THE DCPS 1 INTO THE INTERCEPTED/UNAUTHORIZED DRONE), UNTIL THE INTERCEPTED/ UNAUTHORIZED OR ROGUE DRONE IS SUBDUED OR BROUGHT UNDER CONTROL.

FIG. 5B

```
#!/usr/bin/env python
""" Drone pilot - Control of MRUAV """
""" pix-goto.py -> Script that commands the vehicle to follow sdr signal. """

__license__ = "GPL"
__version__ = "2.0"

import time
from dronekit import connect, VehicleMode, LocationGlobalRelative
import modules.UDPserver as udp
from modules.utils import *
from modules.pixVehicle import *

# Connection to the vehicle
# SITL via TCP
#vehicle = connect('tcp:127.0.0.1:6670', wait_ready=True)
#SITL/vehicle via UDP (connection coming from mavproxy.py)
vehicle = connect('udp:127.0.0.1:14549', wait_ready=True)
# Direct UART communication to Pixhawk
#vehicle = connect('/dev/ttyAMA0', wait_ready=True)

""" Mission starts here """

arm_and_takeoff(vehicle, 10)

Comparison of Signal Strength to provide accurate location of rogue signal point1 = LocationGlobalRelative(direction.sql,direction.sql, 25)
point2 = LocationGlobalRelative(direction.sql,direction.sql, 25)
point3 = LocationGlobalRelative(direction.sql,direction.sql, 25)

go_to(vehicle, point1)

print "Returning to Launch"
vehicle.mode = VehicleMode("RTL")

print "Waiting 10 seconds RTL"
time.sleep(10)

print "Landing the Aircraft"
vehicle.mode = VehicleMode("LAND")
```

FOLLOW SCRIPT EXAMPLE

FIG. 5C

REMOTELY OPERATED VEHICLE (ROV) AND DATA COLLECTION PROTECTION SYSTEM (DCPS)

CROSS-REFERENCE TO RELATED APPLICATIONS

The present application claims priority to U.S. Provisional Patent Application Ser. No. 62/160,662, filed May 13, 2015, entitled "Remotely Operated Vehicle (ROV) and Data Collection Protection System," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,239) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a protection system against undesired interference, presence, or data collection by Remotely Operated Vehicles (ROVs). In particular, various embodiments of the invention include a system operable to protect entities from harm or risks associated with ROVs as well as sensors carried by ROVs.

A significant increase in ROVs has increased risks of such vehicles running out of control or being used in improper ways. ROVs, such as aerial ROVs, pose an increasing risk to include violating the privacy of various parties such as celebrities or disturbing wildlife or causing undesirable interference with various activities or systems arising from electronic emissions, presenting a physical danger to other entities (e.g., flying a ROV into an airliner flight path), or an ability to stream real-time video data to a receiver. Moreover, manufacturing and purchasing costs have decreased so that many persons or entities can now afford to use ROVs and related technology. Accordingly, a need exists to manage these increasing sets of risks.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 5A and 5B show an exemplary simplified software architecture for operating various components on an exemplary ROV DCPS (e.g., see FIG. 4);

FIG. 5C shows an exemplary Follow Script introduced in FIGS. 5A and 5B;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
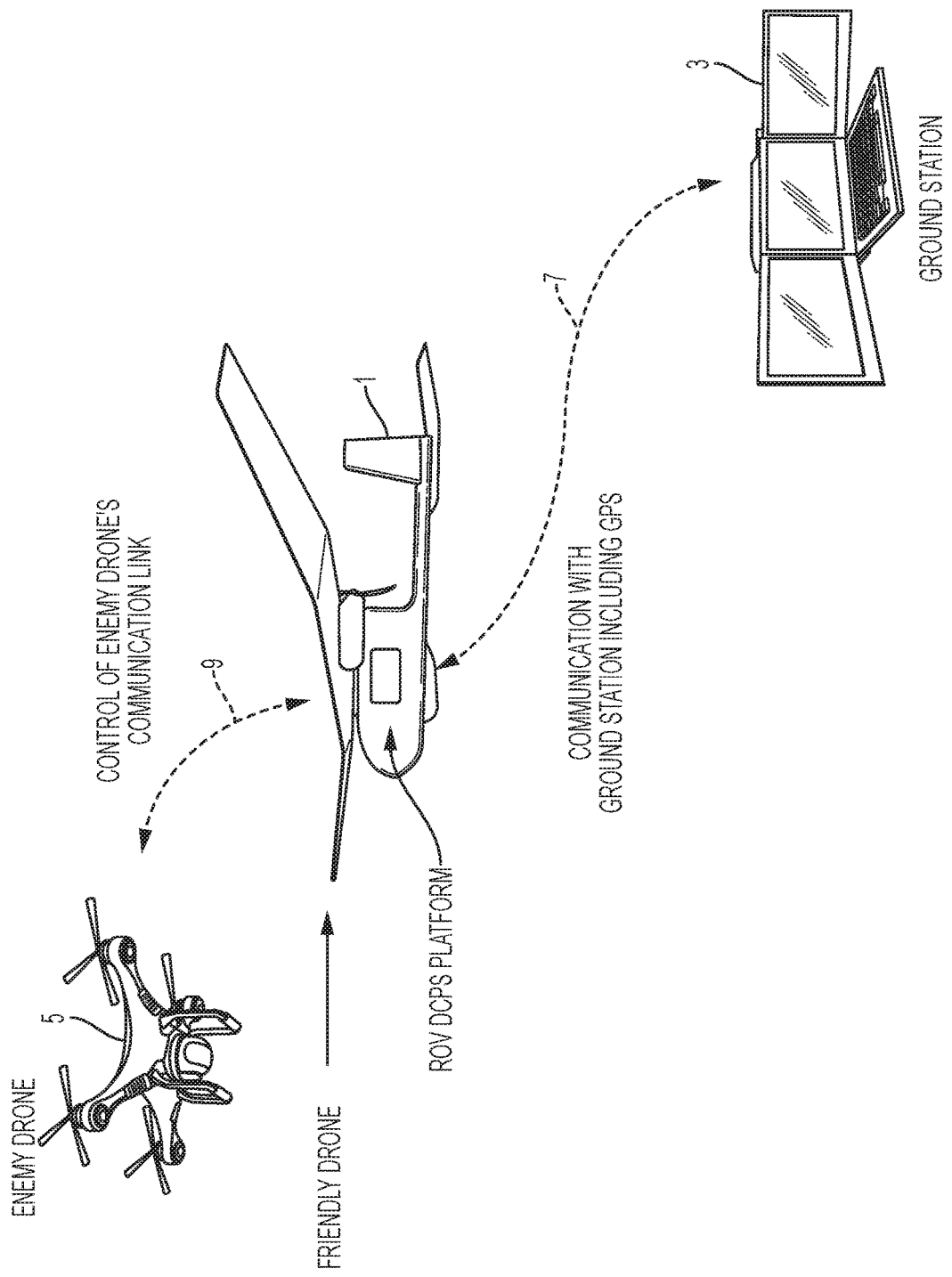
FIG. 1 shows an embodiment of the invention including a ROV Data Collection Protection System (DCPS) platform.

Referring initially to FIG. 1, a flying ROV with a ROV DCPS Platform 1 installed is shown with a communication's link with a ground communication station (GCS) 3. The ROV DCPS 1 is configured to take control of an ROV of interest (ROVI) 5 to include taking over a communication link with the ROVI 5 via various control engagements 9 such as RF signals. The GCS 3 controls the ROV DCPS 1 via a communication link 7 such as satellite or other systems.

Figure 2:
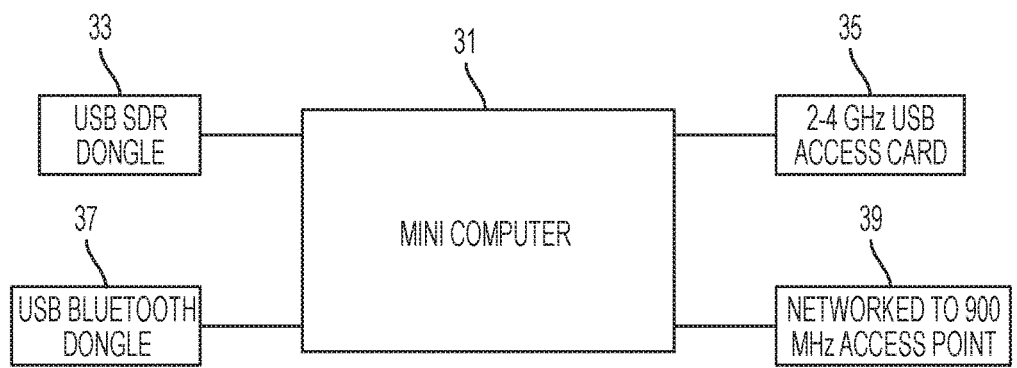
FIG. 2 shows exemplary components associated with a ROV DCPS.

Referring to FIG. 2, an embodiment of the ROV DCPS 1 includes a minicomputer (MC) 31 (e.g., a Banana Pi or a Raspberry Pi 2 Model B, including a 900 MHz quad-core ARM Cortex-A7 CPU, 1 GB RAM, 4 USB ports, full HDMI port, audio and composite video jacks, camera interface, display interface, and a VideoCore IV 3D graphics core). This embodiment includes an ability to reduce a footprint of an exemplary platform as it would allow for the removal of the USB hub. A 900 MHz MikroTik Access Point 39, a high power wireless Wi-Fi USB adapter 35 allows communication from the ROV DCPS 1 to the GCS 3. A USB BU353 GPS receiver—(not shown) can relay GPS data to the MC 31. Additional elements include multiple antennas (e.g. nine baseline interferometry (BLI) Antennas), a USB 5V 2a 500 MHA external battery, a USB RTL-SDR, RF+DAB dongle 33 can be used with a software defined radio (SDR) and DVB video capture, compatible with SDR software with (e.g. a tuning range of 25 MHz-1700 MHz for the SDR), a USB Upconverter for SDR that can extend a frequency coverage on HF bands, and a USB Hub—if necessary.

Embodiments of the ability can be used to take over a ROVI 5 communication link. Additional functionality can include an ability to monitor what data collected was collected by a ROVI 5. An embodiment can include a variant that can take control of the ROVI 5 to, prevent the data from being sent back, or otherwise interfering with the ROVI 5's operation. Embodiments can be used by parties that want to be able to keep ROVIs 5 from collecting information. Examples can include event venues (especially open-air concerts, fairs, etc.), celebrities (such as their homes or to prevent paparazzi), security for homes and businesses (especially those that might be of interest to nefarious parties such as banks, schools, museums, or wealth individuals).

Figure 3:
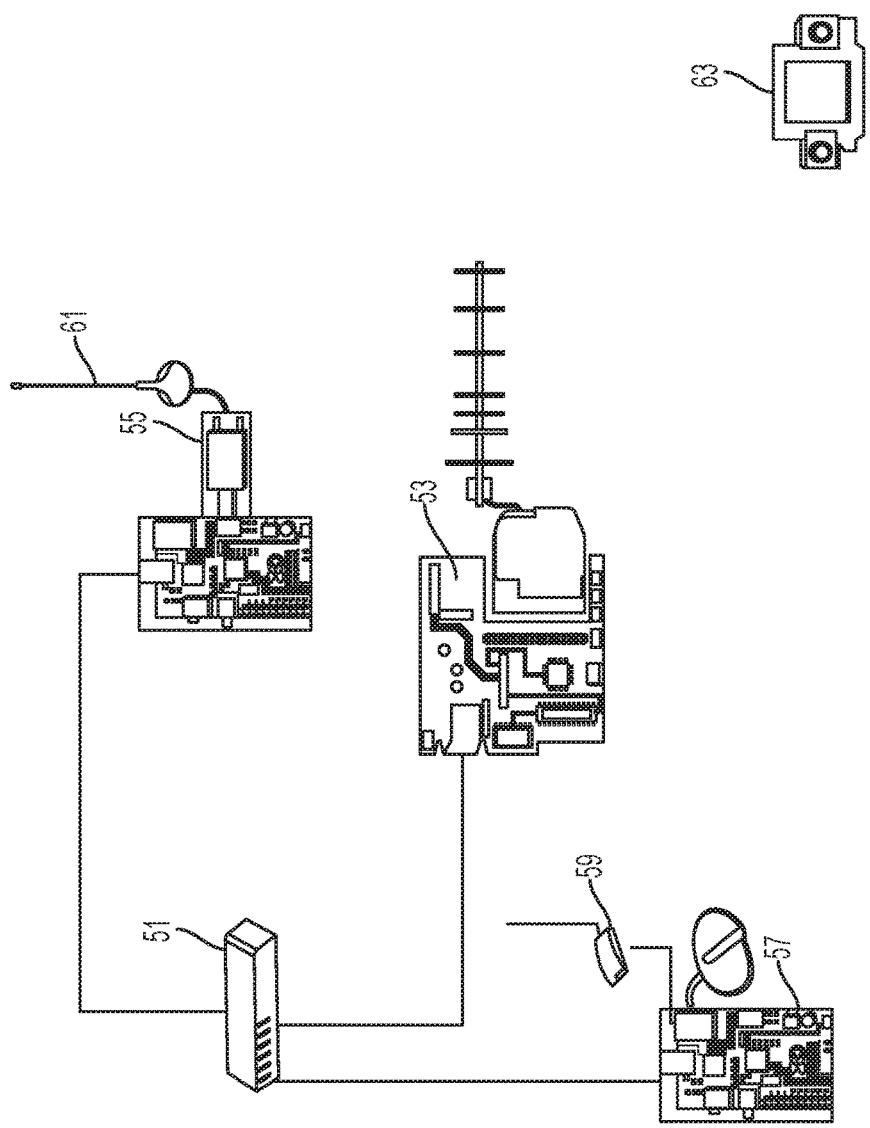
FIG. 3 shows an exemplary component view of selected ROV DCPS on board systems architecture elements of an exemplary ROV DCPS.

FIG. 3 shows an exemplary component view of selected ROV DCPS on board systems architecture elements of an exemplary ROV DCPS. A miniature switch 51 can be used to connect various wireless systems. A wireless system 53 (e.g. 700 MHz wireless system), to allow streaming of the ROV DCPS to a ground receiving system. A MC 57 is provided that includes an external GPS and 2.5 Ghz USB Alfa Ubuntu installed with hacking tools and autonomous scripts that seeks out, either autonomously or by command, ROVI systems or rogue systems' wireless signals used to control or communicate with the ROVI to hack and block or hack and compromise and/or control the ROVI. The MC 57 can also communicate via a wireless router hub wireless system 59. A fuel/power system 63 (e.g. a fuel cell), is provided to power all systems on the exemplary ROV DCPS. Another MC 55 with external SDR card and omni antenna and Linux software installed along with an antenna 61.

Figure 4:
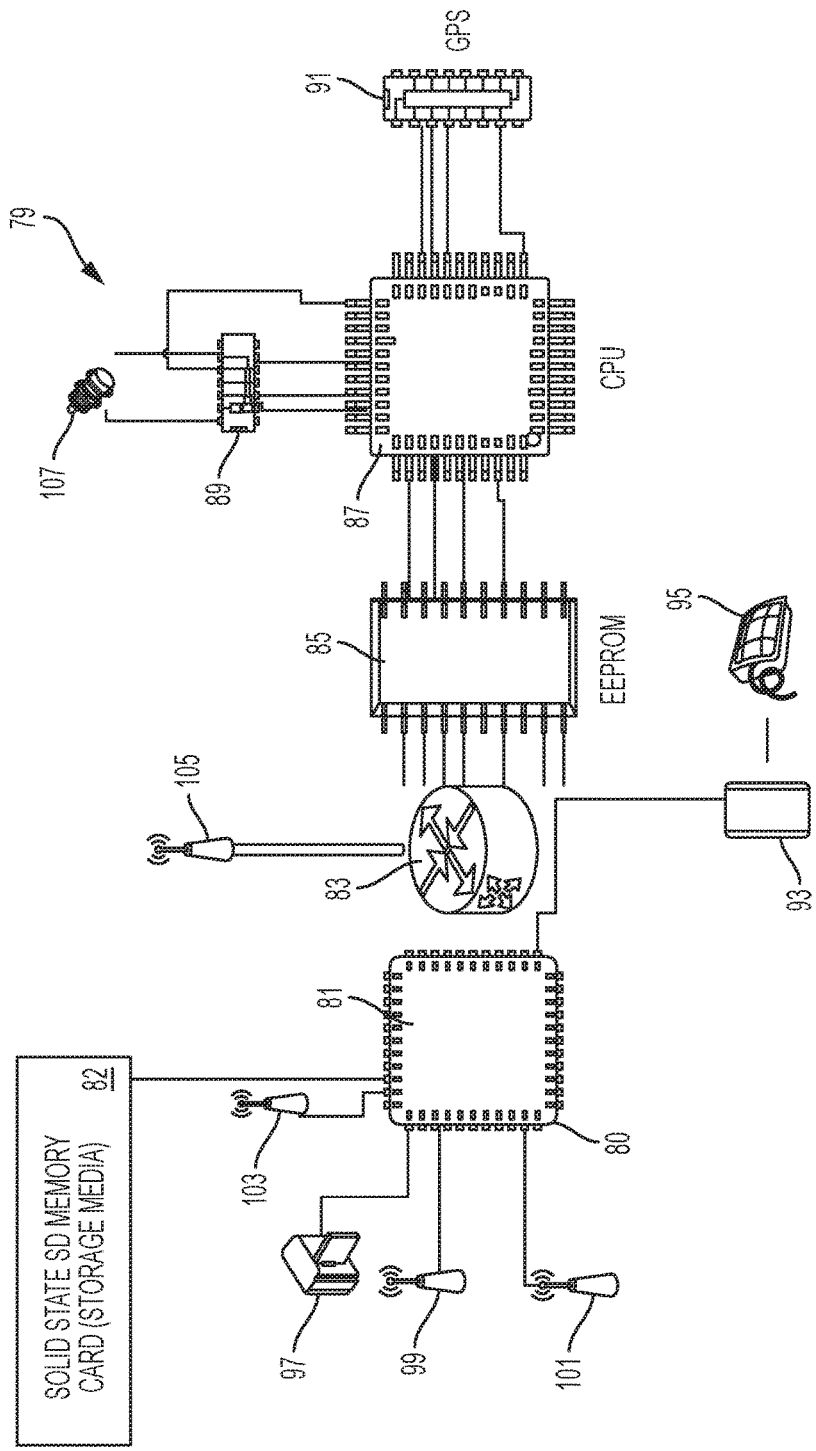
FIG. 4 shows a another exemplary component view of selected ROV DCPS on board systems architecture elements including an ROV DCPS autonomous control and guidance system (ACGS)

FIG. 4 shows a another exemplary component view of selected ROV DCPS 1 on board systems architecture elements including an ROV DCPS autonomous control and guidance system (ACGS) 79. A MC 80 (e.g. Linux based micro or minicomputer (MC)) controls sensor gathering (video, wireless sensing, SDR, GPS coordinates) and hacking/attack/intrusion/control software (e.g., hacking detected wireless access, man-in-the-middle attacks, swarming, among many others) along with a processor 81. Another system 83 interacts with antenna 105 (e.g. 900 and 700 Mhz wireless transmission of data for a ground receiving station). An EEPROM 85 interacts with the system 83, a CPU 87, a gyro and accelerometer 87, servers 107, and a GPS 91. A video interface 97, a SDR 99, and wireless detection 101 is connected with the MC 80/processor 81. A battery 93 is provided to provide power to the MC 80. Another power system (e.g. flexible solar panels) embedded on a ROV DCPS to continuously charge the better 93 for longer flights and operations.

Software includes a first plurality of machine readable instructions configured to detect remotely operated vehicle of interest (ROVI) configured to identify a first plurality of signals of interest from the ROVI comprising a control signal and a second plurality of signals of interest comprising a video signal. A second plurality of machine readable instructions configured to control a data link comprising the first plurality of signals of interests and the second plurality of signals.

Figure 5A:
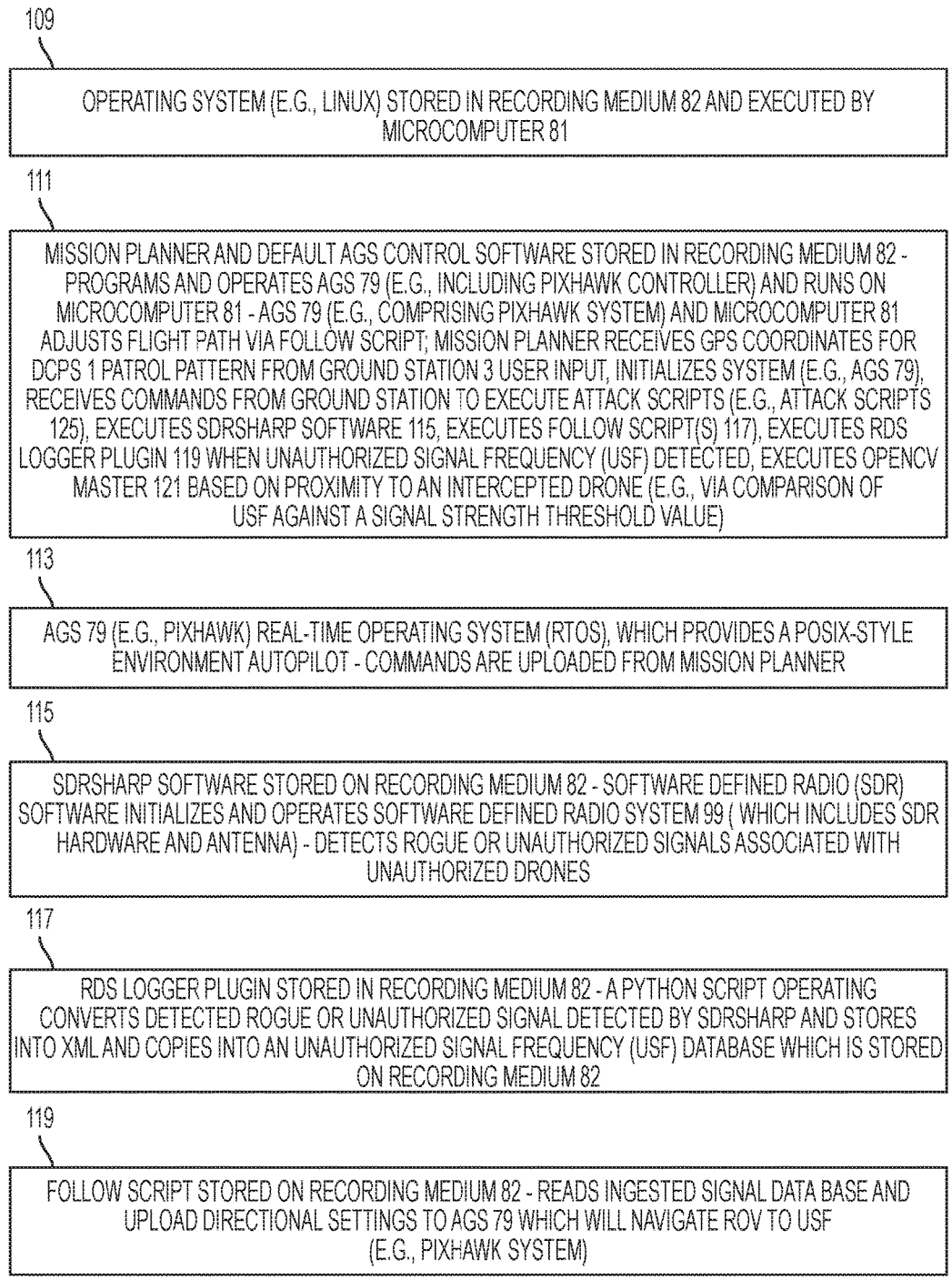

FIGS. 5A and 5B shows an exemplary simplified software architecture for operating various components on an exemplary ROV DCPS (e.g., see FIG. 4). An operating System (e.g., LINUX) stored in recording medium 82 and executed by microcomputer 81. Mission Planner and Default AGS Control Software stored in recording medium 82—programs and operates AGS 79 (e.g. including PixHawk controller) and runs on microcomputer 81—AGS 79 (e.g. comprising PixHawk system) and Microcomputer 81 adjusts flight path via follow script; Mission planner receives GPS coordinates for DCPS 1 patrol pattern from Ground Station 3 user input, initializes system (e.g. AGS 79), receives commands from ground station to execute attack scripts (e.g. attack scripts 125), executes SDRSHARP software 115, executes follow script(s) 117, executes RDS Logger Plugin 119 when unauthorized signal frequency (USF) detected, executes opencv master 121 based on proximity to an intercepted drone (e.g. via comparison of USF against a signal strength threshold value). AGS 79 (e.g. PixHawk) real-time operating system (RTOS), which provides a POSIX-style environment autopilot—commands are uploaded from mission planner. sdrsharp software stored on recording medium 82—Software Designed Radio (SDR) Software initializes and operates software defined radio system 99 (which includes SDR hardware and antenna)—detects rogue or unauthorized signals associated with unauthorized drones. RDS Logger Plugin stored in recording medium 82—a python script operating converts detected rogue or unauthorized signal detected by sdrsharp and stores into xml and copies into an unauthorized signal frequency (USF) database which is stored on recording medium 82. Follow script stored on recording medium 82—reads ingested signal data base and uploads directional settings to AGS 79 which will navigate ROV to USF (e.g. PixHawk system). opencv master—operates camera 97, executes pattern recognition of potentially unauthorized drone, matches images from camera 97 of image captures of an intercepted drone against a database of unauthorized drone digital images or verifies authorized drone based on authorized drone images when it comes into a predetermined range based on signal strength of the USF, and operates and generates a video back to the Ground Station 3 for a "go", or "no go" interaction with the intercepted drone (e.g. execution of attack scripts 125). Ardupilot rogue master—once a ground station sends a "go" signal to the ROV DCSP 1, this program overrides the follow script 117 and defaults in mission planner 111 and uses opencv master 121 to visually lock onto rogue drone, then generate flight control inputs for ACGS 79 to enable a following routine of the intercepted drone designated as an unauthorized drone by the ground station 3, and initiates attack scripts 125 which substitutes control inputs from mission planner 111. Attack script—continues or initiates execution of the ardupilot rogue master 123 to ensures ACGS 79 maintains a predetermined spatial relationship with the intercepted/unauthorized drone, compares USF signals and visuals captures by the opencv master 121 to database of images and signals, selects one of a plurality of electronic warfare or attack EW/A attack programs based on the images and signals (e.g. initiating a WPA/WEP hacking) of the intercepted or unauthorized drone then feeding replacement or substitute control inputs into the intercepted/unauthorized drone from a library of intercepted/unauthorized drone control inputs (e.g. land immediately, turn on a predetermined or ground station input heading and land at designated location, etc.), initiates selected EW/A attack program, determines success or failure of selected EW/A attack program, if failure then selects another EW/A attack program (e.g. jamming intercepted or unauthorized drone's USF signal), determines success or failure, if failure then select another EW/A attack program to operate the ACGS 79 (e.g. crash the DCPS 1 into the intercepted/unauthorized drone), until the intercepted/unauthorized or rogue drone is subdued or brought under control.

FIG. 5C shows an exemplary simplified Follow Script introduced in FIGS. 5A and 5B. This exemplary follow script shows a simplified follow script that executes instructions to the ACGS 79 and other components of the DCPS 1 to track and follow an unauthorized or intercepted drone.

Figure 6:
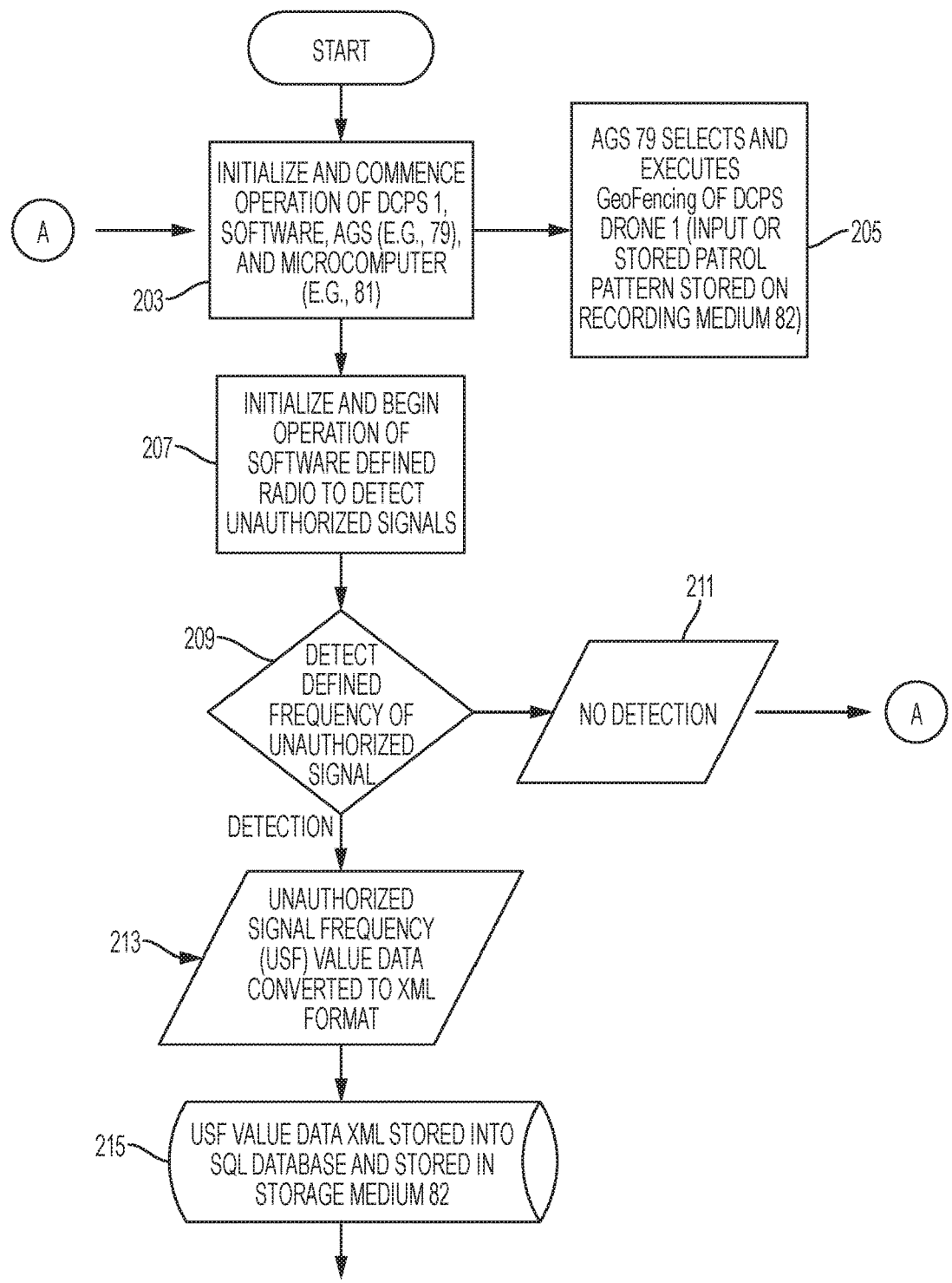
FIG. 6 shows a first portion of an exemplary method for operating an exemplary embodiment of a ROV DCPS (e.g., see FIGS. 1 and 4)

FIG. 6 shows a first portion of an exemplary method for operating an exemplary embodiment of a ROV DCPS (e.g., see FIGS. 1 and 4). At step 203, initialize and commence operation of DCPS 1, Software, AGS (e.g. 79), and microcomputer (e.g. 81); at step 205 AGS 79 selects and executes GeoFencing of DCPS Drone 1 (Input or Stored Patrol Pattern stored on recording medium 82); at step 207, initialize and begin Operation of Software Defined Radio to Detect Unauthorized Signals; at step 209, Detect Defined Frequency of Unauthorized Signal; at step 211, No Detection, back to A. If there is detection, then step 213, Unauthorized Signal Frequency (USF) Value Data Sql Database and Store in Storage Medium 82.

Figure 7:
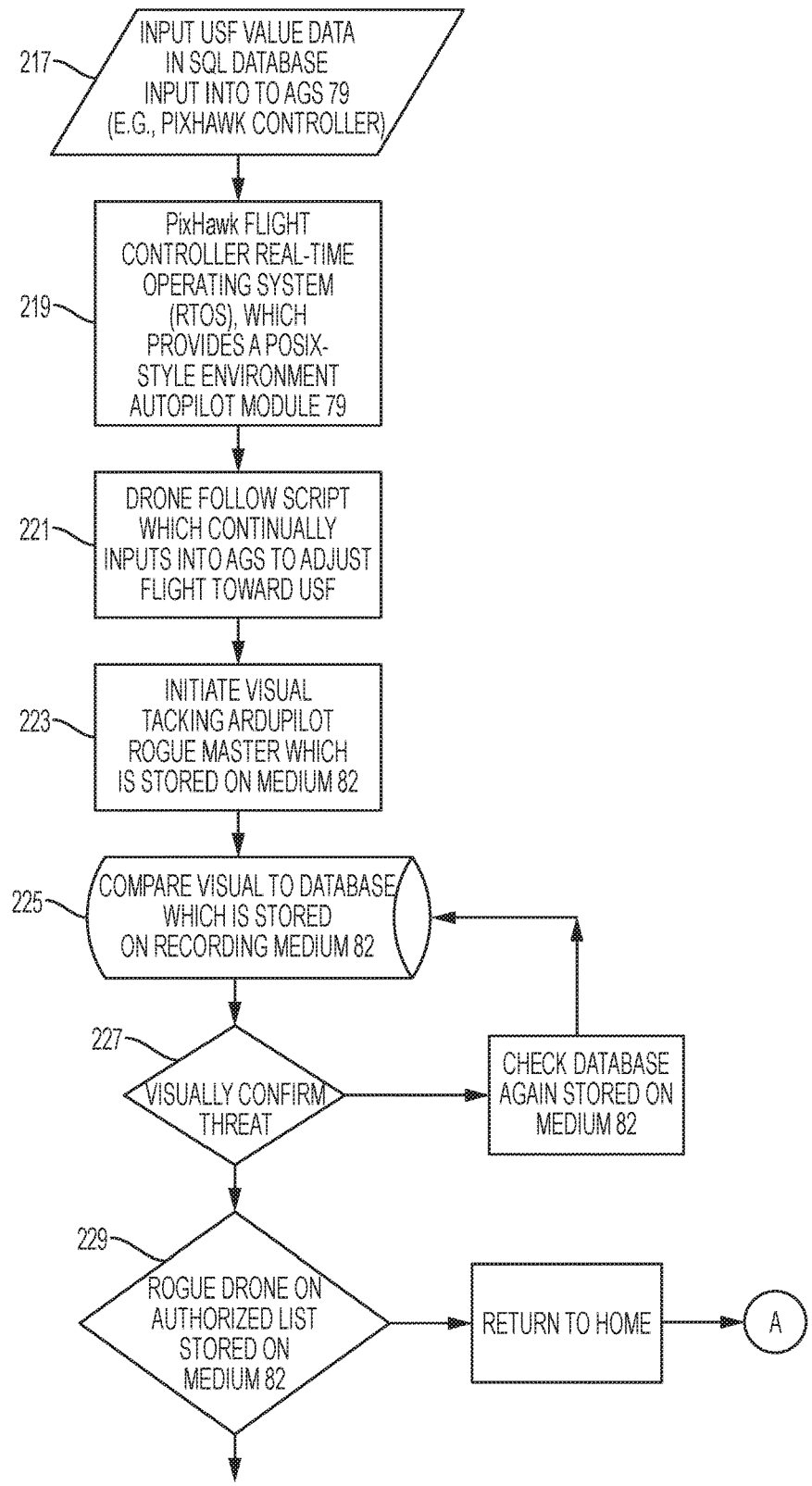
FIG. 7 shows a continuation of the FIG. 6 exemplary method for operating the exemplary embodiment of the ROV DCPS.

FIG. 7 shows a continuation of the FIG. 6 exemplary method for operating the exemplary embodiment of the ROV DCPS. At step 217, Input USF Value Data in SQL Database Input into AGS 79 (e.g. Pixhawk Controller); at step 219, PixHawk Flight Controller real-time operating system (RTOS), which provides a POSIX-style environment autopilot module 79; at step 221, Drone Follow Script which continually inputs into AGS to adjust flight toward USF; at step 223, Initiate Visual Tacking ardupilot rogue master which is stored on medium 82; at step 225, Compare visual to database which is stored on recording medium 82; at step 227, Visually Confirm Threat, then Check data base again Stored on medium 82, step 225; and at step 229, Rogue Drone on Authorized list Stored on medium 82, if return to home, then back to A.

Figure 8:
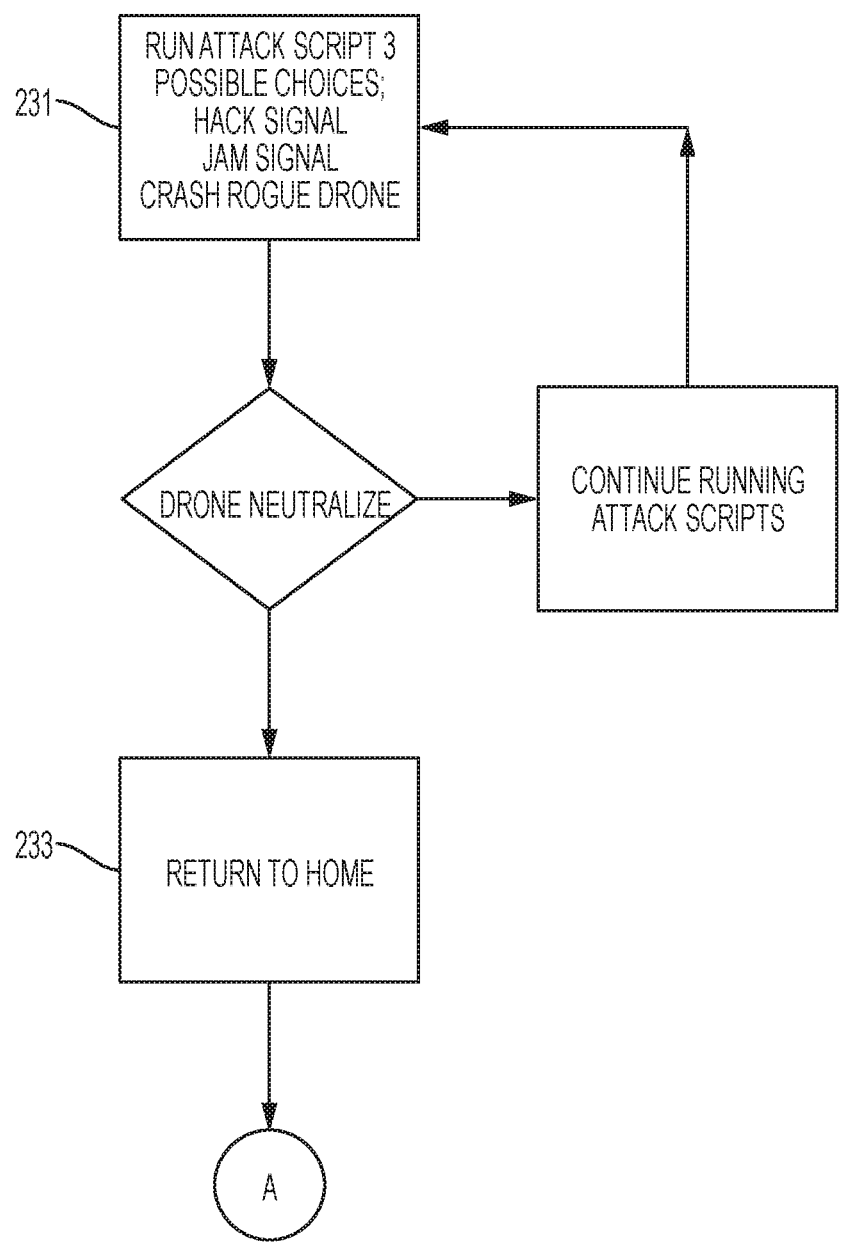
FIG. 8 shows a continuation of the FIG. 7 exemplary method for operating the exemplary embodiment of the ROV DCPS.

FIG. 8 shows a continuation of the FIG. 7 exemplary method for operating the exemplary embodiment of the ROV DCPS. At Step 231, Run attack Script 3 possible choices; Hack signal, Jam signal, or Crash rogue drone, Drone Neutralize, then Continue Running Attack Scripts; at step 233 return home back to A.

Although the invention has been described in detail with reference to certain preferred embodiments, variations and modifications exist within the spirit and scope of the invention as described and defined in the following claims.

The invention claimed is:

1. A protection and control system comprising:
a flying platform including a lifting and control mechanism;
a first and second communication and data communication system;
a power system configured to provide power to at least some of the protection and control system;
a processor;
a recording medium operable to store a plurality of machine readable instructions configured to control at least some of the protection and control system and functions, wherein said plurality of machine readable instructions comprises:
a first plurality of machine readable instructions configured to detect remotely operated vehicle of interest (ROVI) configured to identify a first plurality of signals of interest from the ROVI comprising a control signal and a second plurality of signals of interest comprising a video signal;
a second plurality of machine readable instructions configured to control a data link comprising the first plurality of signals of interests and the second plurality of signals.

2. A protection and control system adapted to detect, identify, and selectively control a remotely operated mobile system (ROMS) comprising:
a first control station and a mobile system that is in communication with and controlled by the first control station;
wherein the first control station comprises at least one display, an operator flight control section that receivers operator flight control inputs to the mobile system, a first control station controller section that executes a plurality of operations including control of the mobile system and the first control station, a user input and output section that receives user mobile system operation command inputs for input into the first control station controller section, a first control station communication system that receives the flight control inputs and mobile system operation command inputs for transmission to the mobile system based on control commands from the first control station controller section;
wherein, the mobile system further comprises:
a platform section mounting and supporting a thrust generating system, one or more sensors, a navigation and orientation detection section, a plurality of communication systems, an antenna section comprising at least one antenna coupled with the plurality of communication systems, a control section that controls systems on the mobile system, and a power section that supplies power to the systems mounted on the mobile system;
wherein the navigation and orientation detection section is coupled with the controls section and comprises a microelectronic gyroscope, global positioning system, and a microelectronic three-axis accelerometer and is configured to measure and record flight data comprising telemetry data comprising position, speed, orientation with respect to a reference frame and altitude;
wherein the thrust generating system coupled with said control section, the thrust generating system includes a propulsion system comprising a fan system comprising an electric power motor rotating a fan or propeller and a multi-axis actuator system coupled to the fan system that collectively generates both lift and provides three axis flight control for the flying platform;
wherein the plurality of communications systems comprise a first communication and second communication system coupled with the antenna section and the control section;
wherein the one or more sensors is coupled with the controls section and comprises a digital imager or video camera;
wherein the control section further comprises:
a processor section comprising one or more processors that read and execute a plurality of non-transitory machine readable instructions or commands;
a machine instruction and data storage section coupled with at least the processor section that is adapted to store at least some of the plurality of non-transitory machine instructions and machine readable data, the machine instruction and data storage section storing a library of comparator ROMS images and ROMS status data, each stored comparator ROMS images associated with ROMS status data comprising an authorized ROMS status identifier and unauthorized ROMS status identifier, the machine instruction and storage data section further storing a plurality of ROMS control scripts, wherein the plurality of non-transitory machine readable instructions comprise:
a software defined radio system (SDRS) adapted control the plurality of communication systems and an encryption system that encrypts information sent from at least one of the plurality of communication systems to the second section;
a first plurality of machine readable instructions that operates the SDRS to receive signals from the antenna and detect and identify emitted electromagnetic spectrum signals received by the antenna and communicate with sources of those emitted electromagnetic signals including signals sent from or to a third communication system on a remotely operated mobile system (ROMS) that communicates ROMS control signals and ROMS video signals with a ROMS control station;

a second plurality of machine readable instructions configured to control the mobile system's altitude and movement to maneuver the mobile system to one or more predetermined navigation points or along a patrol pattern while the first plurality of machine readable instructions is operating the SDRS to detect at least one of the ROMS control signals or ROMS video signals;

a third plurality of machine readable instructions configured to select a ROMS as a detected ROMS, perform target tracking, and maneuver the mobile system to achieve and maintain a predefined distance and altitude relationship between the ROMS and the mobile system when the SDRS and the first plurality of machine readable instructions detects at least one of the ROMS control signals or ROMS video signals from the detected ROMS;

a fourth plurality of machine readable instructions configured to operate the one or more sensors to capture one or more identification images of the detected ROMS using the digital imager or video camera and compare the identification images to the comparator ROMS images to determine if the identification images of the detected ROMS matches one of the comparator ROMS images;

a fifth plurality of machine readable instructions that terminate execution of the third and fourth plurality of machine readable instructions and recommence execution of the first and second plurality of machine readable instructions if one of the comparator ROMS image with an authorized ROMS status identifier matches at least one of the identification images of the detected ROMS or a return to patrol command to recommence execution of the first and second plurality of machine readable instructions is received from the first control station; and a sixth plurality of machine readable instructions that executes one or more of the ROMS control scripts to take control of the detected ROMS if an execute ROMS control scripts command is received from the first control station, after the fifth plurality of machine readable instructions matches at least one said identification image of the detected ROMS with at least one comparator ROMS image having an associated unauthorized status identifier, or there is no match between at least one comparator ROMS image;

wherein the ROMS control scripts comprises a plurality of scripts that operate the SDRS to send signals to the third communication system on the ROMS in a predetermined sequence to override one or more functions of the ROMS, where the override actions comprise instructions to override flight control signals from the ROMS control station, substituting override flight control commands to move the ROMS to a specific location or force it to land, or control a data link between the ROMS control station and the ROMS, wherein the sixth plurality of machine readable instructions will sequentially execute a sequence of the plurality of scripts in turn if a selected script's execution does not result in an associated control override effect on the selected ROMS based on a comparison with a stored predicted response associated with each ROMS control script and actual response detected by the video camera comprising at least a first response of movement of the ROMS to land on a surface.

3. The system as in claim 2, wherein the control section comprises a first processor and a second processor, wherein the first processor comprises a microcomputer with an operating system configured to implement commands and communicate between the second processor and systems comprising the camera and the SDR, wherein the second processor is configured to execute at least some of the plurality of non-transitory machine instructions to control the thrust generating system, the one or more sensors, the navigation and orientation detection system, and the power section.

4. The system as in claim 3, wherein the machine instruction and data storage section comprises a first and second storage device, wherein the first storage device comprises a solid-state memory card and stores a portion of said plurality of non-transitory machine readable instructions and data that is read by the first processor, wherein the second storage device is configured to store a second portion of the plurality of non-transitory machine readable instructions and data read by the second processor.

* * * * *